(12) United States Patent
Ishibai et al.

(10) Patent No.: US 8,932,397 B2
(45) Date of Patent: Jan. 13, 2015

(54) NEAR-INFRARED SHIELDING COATING AGENT CURABLE AT ORDINARY TEMPERATURES, NEAR INFRARED SHIELDING FILM USING SAME, AND MANUFACTURING METHOD THEREFOR

(75) Inventors: Yoichi Ishibai, Yokkaichi (JP); Akihito Sakai, Yokkaichi (JP); Takashi Nishikawa, Yokkaichi (JP); Kenji Kataoka, Yokkaichi (JP); Kiyoyuki Hotta, Yokkaichi (JP); Hideyo Ando, Shinshiro (JP); Yuzo Fukuda, Shinshiro (JP); Yorisuke Kondo, Shinshiro (JP); Kazuya Suzuki, Shinsiro (JP)

(73) Assignee: Ishihara Sangyo Kaisha. Ltd., Osaka (JP)

( * ) Notice: Subject to any disclaimer, the term of this patent is extended or adjusted under 35 U.S.C. 154(b) by 523 days.

(21) Appl. No.: 13/376,869

(22) PCT Filed: Jun. 9, 2010

(86) PCT No.: PCT/JP2010/059743
§ 371 (c)(1), (2), (4) Date: Jan. 25, 2012

(87) PCT Pub. No.: WO2010/143645
PCT Pub. Date: Dec. 16, 2010

(65) Prior Publication Data
US 2012/0168649 A1 Jul. 5, 2012

(30) Foreign Application Priority Data

Jun. 12, 2009 (JP) ................................. 2009-141348

(51) Int. Cl.
| | |
|---|---|
| C09D 5/32 | (2006.01) |
| C08K 5/5435 | (2006.01) |
| C08K 5/5455 | (2006.01) |
| C03C 17/34 | (2006.01) |
| C09D 7/12 | (2006.01) |
| C08K 3/22 | (2006.01) |
| C08K 5/5419 | (2006.01) |

(52) U.S. Cl.
CPC ................ *C09D 5/32* (2013.01); *C08K 5/5435* (2013.01); *C08K 5/5455* (2013.01); *C03C 17/3417* (2013.01); *C09D 7/1216* (2013.01); *C03C 2217/71* (2013.01); *C08K 3/22* (2013.01); *C08K 5/5419* (2013.01)
USPC .............................. 106/287.14; 106/287.11

(58) Field of Classification Search
USPC ........................................ 106/287.11, 287.14
See application file for complete search history.

(56) References Cited

U.S. PATENT DOCUMENTS 8,216,670 B2 * 7/2012 Kumon et al. ................ 428/328

FOREIGN PATENT DOCUMENTS

| | | |
|---|---|---|
| JP | 5070178 | 3/1993 |
| JP | 2001262064 | 9/2001 |
| JP | 2005194169 | 7/2005 |
| JP | 2008011048 | 1/2008 |
| JP | 2009-067998 A | 4/2009 |
| JP | 2009-84476 | 4/2009 |
| WO | WO 2004/011381 | 2/2004 |
| WO | WO 2007/058016 | 5/2007 |
| WO | WO 2008/029620 | 3/2008 |

OTHER PUBLICATIONS

Paz et al, "Photooxidative self-cleaning transparent titanium dioxide films on glass", J. Mater. Res., vol. 10, No. 11, (Nov 1995).*

* cited by examiner

*Primary Examiner* — David M Brunsman
(74) *Attorney, Agent, or Firm* — Paul E. White, Jr.; Manelli Selter PLLC

(57) ABSTRACT

Provided is a near-infrared shielding coating agent containing: (1) an inorganic near-infrared absorbing agent; (2) a tetrafunctional silicon compound represented by general formula $Si(OR1)_4$, a hydrolysate thereof, and/or a condensation polymerization product thereof; (3) a trifunctional silicon compound represented by general formula $R2Si(OR3)_3$, a hydrolysate thereof, and/or a condensation polymerization product thereof; (4) a silane coupling agent represented by one of the general formulas $Si(X)_3$—Y or $R4Si(X)_2$—Y, a hydrolysate thereof, and/or a condensation polymerization product thereof; and (5) a solvent. This coating agent allows the formation, at an ordinary temperature between 5° C. and 40° C., of a near-infrared shielding film that has a high film hardness and is not prone to cracks.

17 Claims, No Drawings

NEAR-INFRARED SHIELDING COATING AGENT CURABLE AT ORDINARY TEMPERATURES, NEAR INFRARED SHIELDING FILM USING SAME, AND MANUFACTURING METHOD THEREFOR

This application is the national phase of international application PCT/JP2010/059743 filed 9 Jun. 2010 which designated the U.S.

TECHNICAL FIELD

The present invention relates to a coating agent for shielding near-infrared rays, curable at ordinary temperatures. In addition, the present invention relates to a near-infrared shielding coating obtained using the near-infrared shielding coating agent, and a method for manufacturing the near-infrared shielding coating. Further, the present invention relates to an article in which the above near-infrared shielding coating is formed on a substrate, an article in which a photocatalytic coating is formed on the near-infrared shielding coating, and an article in which a photocatalytic coating is formed on a surface different from a surface on which the near-infrared shielding coating is formed, and methods for manufacturing the articles.

BACKGROUND ART

The windows of buildings, show windows, sunroofs, roofs, walls, and the like, as well as the windows and bodies of automobiles, trains, and the like are exposed to sunlight, and therefore, particularly in summer, the interior temperature increases, and the comfortableness worsens. Therefore, measures are promoted in which a material for shielding sunlight, particularly near-infrared rays, is applied to a member, such as a window of a building, to shield near-infrared rays to suppress an increase in interior temperature and improve comfortableness. In order to apply a near-infrared shielding material to a member, such as a window of a building, a coating agent comprising the near-infrared shielding material is applied to the surface of glass, ceramic, or plastic that is the raw material of the member when the glass, ceramic, or plastic is manufactured or molded. Further, a coating agent comprising the near-infrared shielding material is applied to the surface of the member at a place where it is used, on the window or the like.

As such a near-infrared shielding material, oxide materials, such as tin oxide, antimony-doped tin oxide, indium oxide, tin-doped indium oxide, zinc oxide, aluminum-doped zinc oxide, lanthanum boride, cerium oxide, ruthenium oxide, and tungsten oxide, are known. In addition, metal materials, such as silver, copper, and aluminum, are also known.

As a binder component mixed in the coating agent, for example, Patent Literature 1 describes alkoxysilanes represented by $Si(OR)_m R_n$, wherein $m+n=4$, $m=1$ to 4, $n=0$ to 3, and $R=a$ $C_1$ to $C_4$ alkyl group, or polymers thereof or partial hydrolysates thereof, and describes manufacturing a heat reflecting coating by applying the coating agent and then heating it. In addition, Patent Literature 2 describes a mixture of alkoxysilanes represented by the average composition formula $(CH_3)_m Si(OR)_{4-m}$, wherein R is a methyl group or an ethyl group, and $m=0.2$ to 0.95, a hydrolysate of the above mixture, and a polycondensate of the above mixture, and describes applying the composition on the surface of a glass substrate, semi-curing the composition at a temperature of 200° C. or less, further applying a composition comprising a polysilazane compound thereon, and then performing heat treatment at a temperature of 400° C. or more and 750° C. or less to manufacture glass with an infrared shielding coating.

In addition, Patent Literature 3 describes a polymer substance obtained by reacting a silane compound comprising an amino group with a boron compound, and also describes further adding an alkoxysilane, such as tetramethoxysilane or tetraethoxysilane, or a polycondensate thereof. In addition, Patent Literature 4 describes that when a substance obtained by mixing and reacting a glycidoxypropyl group-containing alkoxysilane and an aminopropyl group-containing alkoxysilane is used, curing is possible at ordinary temperatures.

CITATION LIST

Patent Literature

Patent Literature 1: JP 5-70178 A
Patent Literature 2: JP 2005-194169 A
Patent Literature 3: JP 2008-111048 A
Patent Literature 4: JP 2001-262064 A

SUMMARY OF INVENTION

Technical Problem

The above Patent Literatures 1 and 2 describe using the tetrafunctional silicon compound of a tetraalkoxysilane, the trifunctional silicon compound of an alkyltrialkoxysilane, a mixture thereof, or a hydrolysate thereof or a polycondensate thereof, as the binder. Although the coating hardness is high, curing is difficult at ordinary temperatures, and therefore, heating is required. In addition, a problem is that when heat curing is performed, shrinkage increases, and therefore, the coating surface cracks.

In addition, in Patent Literature 3, the polymer substance obtained by reacting a silane compound comprising an amino group with a boron compound is used as the binder. When these compounds are mixed, a thick liquid is obtained in several minutes to several tens of minutes and then solidified. Since the thick liquid is obtained, it is suitable for processing into a coating or the like. But, a problem is that the thick liquid is not suitable for application, and the application is limited to application by a roller or the like. In addition, in Patent Literature 4, the substance obtained by reacting a glycidoxypropyl group-containing alkoxysilane and an aminopropyl group-containing alkoxysilane is used as the binder. In order to make curing at ordinary temperatures practical, it is necessary to perform mixing and reacting, using a curing catalyst, and age the binder. In addition, a problem is that a long time is required for the aging.

Accordingly, the present invention provides a coating agent in which the preparation of a binder is easy, heating at a temperature of 200° C. or more is not required, the binder can be cured at ordinary temperatures of about 5 to 40° C., and thus, a near-infrared shielding coating can be formed at ordinary temperatures. In addition, the present invention provides a near-infrared shielding coating that can be fabricated at ordinary temperatures, and moreover has high coating hardness and is less likely to crack, and a method for manufacturing the near-infrared shielding coating.

In addition, the present invention provides an article in which the above near-infrared shielding coating is formed on a substrate, an article in which a photocatalytic coating is formed on the near-infrared shielding coating, and further an article in which a photocatalytic coating is formed on a surface different from a surface on which the near-infrared shielding coating is formed, and methods for manufacturing the articles.

Solution to Problem

The present inventors have studied various coating agents that can form near-infrared shielding coatings at ordinary temperatures, and, as a result, found that when three of tetrafunctional silicon type compounds, trifunctional silicon type compounds, and silane type coupling agents are used, the desired near-infrared shielding coating that has high coating hardness and is less likely to crack can be formed, and completed the present invention.

Specifically, the present invention is a near-infrared shielding coating agent curable at ordinary temperatures, comprising (1) an inorganic near-infrared absorbing agent; (2) at least one selected from a tetrafunctional silicon compound represented by a general formula $Si(OR1)_4$, wherein R1 is the same or different and is an alkyl group having 1 to 10 carbon atoms, a hydrolysate thereof, and a polycondensate thereof; (3) at least one selected from a trifunctional silicon compound represented by a general formula $R2Si(OR3)_3$, wherein each of R2 and R3 is the same or different and is an alkyl group having 1 to 10 carbon atoms, a hydrolysate thereof, and a polycondensate thereof; (4) at least one selected from a silane coupling agent represented by a general formula $Si(X)_3$—Y or $R4Si(X)_2$—Y, wherein X is the same or different and represents an alkoxy group, an acetoxy group, or a chlorine atom, R4 is an alkyl group having 1 to 10 carbon atoms, and Y represents an organic group excluding an alkyl group, an alkoxy group, and an acetoxy group, a hydrolysate thereof, and a polycondensate thereof; and (5) a solvent. In addition, the present invention is a near-infrared shielding coating formed by applying the near-infrared shielding coating agent curable at ordinary temperatures to at least one surface of a substrate.

In addition, the present invention is an article comprising a near-infrared shielding coating formed by applying the near-infrared shielding coating agent to at least one surface of a substrate, also an article wherein a photocatalytic coating is formed on at least a part of the near-infrared shielding coating, and further an article wherein the near-infrared shielding coating agent is applied to one surface of the substrate to form the near-infrared shielding coating, and a photocatalytic coating is formed on the other surface of the substrate.

In addition, the present invention is a method for manufacturing a near-infrared shielding coating or an article, comprising applying the near-infrared shielding coating agent to at least one surface of a substrate, and drying the near-infrared shielding coating agent at ordinary temperatures, also a method for manufacturing an article, comprising applying the near-infrared shielding coating agent to at least one surface of a substrate, then applying a coating agent comprising a photocatalyst thereonto, and drying the near-infrared shielding coating agent and the coating agent, and further a method for manufacturing an article, comprising applying the near-infrared shielding coating agent to one surface of a substrate, applying a coating agent comprising a photocatalyst to the other surface of the substrate, and drying the near-infrared shielding coating agent and the coating agent, and the like.

Advantageous Effects of Invention

With the near-infrared shielding coating agent of the present invention, a near-infrared shielding coating can be fabricated at ordinary temperatures of about 5 to 40° C., and the near-infrared shielding coating agent of the present invention can also be applied to substrates vulnerable to heat, such as plastics. Therefore, near-infrared shielding property can be provided to the surfaces of all substrates.

The near-infrared shielding coating fabricated using the above near-infrared shielding coating agent has high near-infrared shielding property, and moreover has high coating hardness and is less likely to crack. In addition, the binder itself has high visible light transmissiveness, and therefore, by selecting an inorganic near-infrared absorbing agent having high transparency, a near-infrared shielding coating having high transparency is obtained. Such a transparent near-infrared shielding coating can also provide near-infrared shielding property to opaque materials, such as steels and ceramics, colored materials, and materials provided with designs, in addition to transparent materials, such as glasses and plastics.

In addition, the near-infrared shielding coating can be manufactured by a relatively simple method, such as applying the above near-infrared shielding coating agent to a substrate and then forming a coating at a temperature in the range of 5 to 40° C. Accordingly, near-infrared shielding property can be directly provided to places where heating operation is difficult, for example, the windows of buildings, show windows, sunroofs, roofs, walls, and the like, as well as the windows and bodies of automobiles, trains, and the like.

In addition, the above near-infrared shielding coating can be combined with a photocatalytic coating, and, in addition to near-infrared shielding property, hydrophilicity, antifogging properties, and contamination prevention properties can be provided to the substrate by photocatalytic property, and malodorous materials, harmful materials, and the like can be decomposed.

DESCRIPTION OF EMBODIMENTS

A near-infrared shielding coating agent curable at ordinary temperatures according to the present invention comprises (1) an inorganic near-infrared absorbing agent; (2) at least one selected from a tetrafunctional silicon compound represented by the general formula $Si(OR1)_4$, wherein R1 is the same or different and is an alkyl group having 1 to 10 carbon atoms, a hydrolysate thereof, and a polycondensate thereof; (3) at least one selected from a trifunctional silicon compound represented by the general formula $R2Si(OR3)_3$, wherein each of R2 and R3 is the same or different and is an alkyl group having 1 to 10 carbon atoms, a hydrolysate thereof, and a polycondensate thereof; (4) at least one selected from a silane coupling agent represented by the general formula $Si(X)_3$—Y or $R4Si(X)_2$—Y, wherein X is the same or different and represents an alkoxy group, an acetoxy group, or a chlorine atom, R4 is an alkyl group having 1 to 10 carbon atoms, and Y represents an organic group excluding an alkyl group, an alkoxy group, and an acetoxy group, a hydrolysate thereof, and a polycondensate thereof; and (5) a solvent.

For the above inorganic near-infrared absorbing agent of (1), those publicly known can be used. Specifically, oxide materials, such as tin oxide, antimony-doped tin oxide, indium oxide, tin-doped indium oxide, zinc oxide, aluminum-doped zinc oxide, lanthanum boride, cerium oxide, ruthenium oxide, and tungsten oxide, and metal materials, such as silver, copper, and aluminum, can be used. The near-infrared absorbing agent is preferably one that provides high visible light transmissiveness when a coating is formed. Such a near-infrared absorbing agent is preferably fine particles comprising at least one selected from the group of tin oxide, indium oxide, zinc oxide, and lanthanum boride, as a main component, more preferably antimony-doped tin oxide fine particles having higher transparency. The particle diameter of the fine particles is preferably about 0.01 to 0.1 μm, more preferably 0.01 to 0.03 μm. If the particle diameter of the fine particles is larger than 0.1 μm, the transparency may decrease. The content of the inorganic near-infrared absorbing agent is preferably 40 to 90% by weight, more preferably 60 to 80% by weight, and more preferably 70 to 80% by weight, with respect to the total amount of the solids of the coating agent. If the content is less than 40% by weight, the near-infrared shielding property decreases, which is not preferred. If the content is more than 90% by weight, the coating hardness tends to decrease, which is not preferred.

The above component of (2) is at least one selected from a tetrafunctional silicon compound represented by the general formula $Si(OR1)_4$, a hydrolysate thereof, and a polycondensate thereof (hereinafter sometimes referred to as tetrafunctional silicon type compounds). In the above formula, R1 is an alkyl group having 1 to 10 carbon atoms, and four of R1 may be the same or different. R1 is preferably one having 1 to 5 carbon atoms in which hydrolysis and polycondensation are likely to occur. A monomer of a tetrafunctional silicon compound is preferred, but hydrolysis and polycondensation may proceed during the storage of the coating agent. In addition, the above component of (2) may be a product obtained by previously hydrolyzing a monomer of a tetrafunctional silicon compound, for example, a partial hydrolysate. Further, the above component of (2) may be a product obtained by previously hydrolyzing and polycondensing a monomer of a tetrafunctional silicon compound, for example, an oligomer having a degree of polymerization of about 2 to 20, preferably an oligomer having a degree of polymerization of about 2 to 10. Specific examples of such compounds include monomers, such as tetramethoxysilane, tetraethoxysilane, tetrapropoxysilane, and tetrabutoxysilane, and hydrolysates and hydrolysis and polycondensation products thereof.

The above component of (3) is at least one selected from a trifunctional silicon compound represented by the general formula $R2Si(OR3)_3$, a hydrolysate thereof, and a polycondensate thereof (hereinafter sometimes referred to as trifunctional silicon type compounds). In the above formula, R2 is an alkyl group having 1 to 10 carbon atoms. R3 is an alkyl group having 1 to 10 carbon atoms, and three of R3 may be the same or different, and may be the same as or different from R2. R3 is preferably one having 1 to 5 carbon atoms in which hydrolysis and polycondensation are likely to occur. A monomer of a trifunctional silicon compound is preferred, but hydrolysis and polycondensation may proceed during the storage of the coating agent. In addition, the above component of (3) may be a product obtained by previously hydrolyzing a monomer of a trifunctional silicon compound, for example, a partial hydrolysate. Further, the above component of (3) may be a product obtained by previously hydrolyzing and polycondensing a monomer of a trifunctional silicon compound, for example, an oligomer having a degree of polymerization of about 2 to 20, preferably an oligomer having a degree of polymerization of about 2 to 10. Specific examples of such compounds include monomers, such as methyltrimethoxysilane, methyltriethoxysilane, methyltripropoxysilane, methyltributoxysilane, ethyltrimethoxysilane, ethyltriethoxysilane, ethyltripropoxysilane, and ethyltributoxysilane, and hydrolysates and hydrolysis and polycondensation products thereof. The weight ratio of the respective components of the above tetrafunctional silicon type compounds of (2) and the above trifunctional silicon type compounds of (3) is preferably 1:1 to 1:10. In this range, a coating that has high coating hardness and is less likely to crack can be formed.

The above component of (4) is at least one selected from a silane coupling agent represented by the general formula $Si(X)_3$—Y or $R4Si(X)_2$—Y, a hydrolysate thereof, and a polycondensate thereof (hereinafter sometimes referred to as silane type coupling agents). In the formula of the general formula $Si(X)_3$—Y, X is an alkoxy group, an acetoxy group, or a chlorine atom, three of X may be the same or different, and Y is an organic group excluding an alkyl group, an alkoxy group, and an acetoxy group. In addition, in the formula of the general formula $R4Si(X)_2$—Y, R4 is an alkyl group having 1 to 10 carbon atoms, X is an alkoxy group, an acetoxy group, or a chlorine atom, two of X may be the same or different, and Y is an organic group excluding an alkyl group, an alkoxy group, and an acetoxy group. The alkoxy group of the above X is preferably an alkoxy group having 1 to 10 carbon atoms. Examples thereof include a methoxy group, an ethoxy group, a butoxy group, and a methoxyethoxy group. In addition, examples of the organic group Y include those having a vinyl group, an epoxy group, an amino group, a ureido group, a methacryl group, an acryl group, a sulfide group, a mercapto group, a ketimino group, an isocyanate group, a chloropropyl group, a styryl group, or the like. Organic groups having an epoxy group, an amino group, or a ureido group are more preferred because a coating that has high coating hardness and is less likely to crack can be formed. A monomer of a silane coupling agent is preferred, but hydrolysis and polycondensation may proceed during the storage of the coating agent. In addition, the above component of (4) may be a product obtained by previously hydrolyzing a monomer of a silane coupling agent, for example, a partial hydrolysate. Further, the above component of (4) may be a product obtained by previously hydrolyzing and polycondensing a monomer of a silane coupling agent, for example, an oligomer having a degree of polymerization of about 2 to 20, preferably an oligomer having a degree of polymerization of about 2 to 10.

A silane coupling agent having a vinyl group includes vinyltrimethoxysilane (KBM-1003; manufactured by Shin-Etsu Chemical Co., Ltd., and Z-6300; manufactured by TOKYO CHEMICAL INDUSTRY CO., LTD.), vinyltriethoxysilane (KBE-1003; manufactured by Shin-Etsu Chemical Co., Ltd., and Z-6519; manufactured by TOKYO CHEMICAL INDUSTRY CO., LTD.), vinyltriisopropoxysilane (Z-6550; manufactured by TOKYO CHEMICAL INDUSTRY CO., LTD.), allyltrimethoxysilane (Z-6825; manufactured by TOKYO CHEMICAL INDUSTRY CO., LTD.), vinyltriacetoxysilane (Z-6075; manufactured by TOKYO CHEMICAL INDUSTRY CO., LTD.), and vinyltris (2-methoxyethoxy)silane (Z-6172; manufactured by TOKYO CHEMICAL INDUSTRY CO., LTD.).

A silane coupling agent having an epoxy group includes 3-glycidoxypropyltrimethoxysilane (KBM-403; manufactured by Shin-Etsu Chemical Co., Ltd., and Z-6040; manufactured by TOKYO CHEMICAL INDUSTRY CO., LTD.), 3-glycidoxypropyltriethoxysilane (KBE-403; manufactured by Shin-Etsu Chemical Co., Ltd., and Z-6041; manufactured by TOKYO CHEMICAL INDUSTRY CO., LTD.), 3-glycidoxypropylmethyldiethoxysilane (KBE-402; manufactured by Shin-Etsu Chemical Co., Ltd., and Z-6042; manufactured by TOKYO CHEMICAL INDUSTRY CO., LTD.), 3-glycidoxypropylmethyldimethoxysilane (Z-6044; manufactured by TOKYO CHEMICAL INDUSTRY CO., LTD.), and 2-(3, 4-epoxycyclohexyl)ethyltrimethoxysilane (Z-6043; manufactured by TOKYO CHEMICAL INDUSTRY CO., LTD.).

Specific examples of a silane coupling agent having an amino group include 3-aminopropyltrimethoxysilane (KBM-903; manufactured by Shin-Etsu Chemical Co., Ltd., and Z-6610; manufactured by TOKYO CHEMICAL INDUSTRY CO., LTD.), 3-aminopropyltriethoxysilane (KBE-903; manufactured by Shin-Etsu Chemical Co., Ltd., and Z-6011; manufactured by TOKYO CHEMICAL INDUSTRY CO., LTD.), N-2-(aminoethyl)-3-aminopropyltrimethoxysilane (KBM-603; manufactured by Shin-Etsu Chemical Co., Ltd., and Z-6020; manufactured by TOKYO CHEMICAL INDUSTRY CO., LTD.), N-2-(aminoethyl)-3-aminopropyltriethoxysilane (KBE-603; manufactured by Shin-Etsu Chemical Co., Ltd.), N-2-(aminoethyl)-3-aminopropylmethyldimethoxysilane (KBM-602; manufactured by Shin-Etsu Chemical Co., Ltd., and Z-6023; manufactured by TOKYO CHEMICAL INDUSTRY CO., LTD.), and N-phenyl-3-aminopropyltrimethoxysilane (KBM-573; manufactured by Shin-Etsu Chemical Co., Ltd., and Z-6883; manufactured by TOKYO CHEMICAL INDUSTRY CO., LTD.).

A silane coupling agent having a ureido group includes 3-ureidopropyltriethoxysilane (KBE-585; manufactured by Shin-Etsu Chemical Co., Ltd., and Z-6675 and Z-6676; manufactured by TOKYO CHEMICAL INDUSTRY CO., LTD.).

A silane coupling agent having a methacryl group includes 3-methacryloxypropylmethyldimethoxysilane (KBE-502; manufactured by Shin-Etsu Chemical Co., Ltd., and Z-6033; manufactured by TOKYO CHEMICAL INDUSTRY CO., LTD.), 3-methacryloxypropyltrimethoxysilane (KBM-503; manufactured by Shin-Etsu Chemical Co., Ltd., and Z-6030; manufactured by TOKYO CHEMICAL INDUSTRY CO., LTD.), and 3-methacryloxypropyltriethoxysilane (Z-6036; manufactured by TOKYO CHEMICAL INDUSTRY CO., LTD.).

A silane coupling agent having an acryl group includes 3-acryloxypropyltrimethoxysilane (KBM-5103; manufactured by Shin-Etsu Chemical Co., Ltd., and Z-6530; manufactured by TOKYO CHEMICAL INDUSTRY CO., LTD.).

The content of the above silane type coupling agents of (4) is preferably 1 to 30% by weight with respect to the total amount of the above tetrafunctional silicon type compounds of (2) and the above trifunctional silicon type compounds of (3). In this range, curing at ordinary temperatures of about 5 to 40° C. proceeds, and moreover, a coating that has high coating hardness and is less likely to crack can be formed. If the content is less than 1% by weight, curing at ordinary temperatures of about 5 to 40° C. is less likely to proceed, which is not preferred. If the content is more than 30% by weight, the coating hardness tends to decrease, which is not preferred.

The above solvent of (5) can be appropriately selected. For example, polar solvents, such as water, alcohols, nitriles, amides, ketones, and sulfoxides, are preferred. Those having a low boiling point are preferred because drying at low temperatures is easy. At least one selected from water and alcohols is more preferred. Examples of alcohols include methanol, ethanol, propanol, and butanol. The amount of the solvent is not particularly limited, and is appropriately set, considering application conditions, application environment, and the like.

Other than the above components, a catalyst for hydrolyzing or polycondensing the above tetrafunctional silicon type compounds of (2), the above trifunctional silicon type compounds of (3), or the above silane type coupling agents of (4) may be added to the near-infrared shielding coating agent of the present invention. Examples of the catalyst can include acids or alkalis. Acetic acid, sodium acetate, or the like can be used. In addition, other than the above components, an ultraviolet shielding agent may be contained in the near-infrared shielding coating agent curable at ordinary temperatures according to the present invention. The ultraviolet shielding agent should be one that shields UV-A or UV-B. Examples thereof include organic ultraviolet shielding agents (ultraviolet absorbing agents), such as benzophenone derivatives, para-aminobenzoic acid derivatives, para-methoxycinnamic acid derivatives, salicylic acid derivatives, and dibenzoylmethane derivatives, and inorganic ultraviolet shielding agents, such as metal oxides, such as iron oxyhydroxide (goethite, FeOOH), iron oxide, cerium oxide, titanium dioxide, zinc oxide, and bismuth oxide, complex oxides using two or more of the above metal oxides, phosphoric acid compounds, such as iron phosphate, titanium phosphate, cerium phosphate, and zinc phosphate, and complex phosphoric acid compounds using two or more of the above phosphoric acid compounds. For the inorganic ultraviolet shielding agents, fine particles having a small particle diameter are preferred, those having an average particle diameter of 200 nm or less are more preferred, and those having an average particle diameter of 100 nm or less are further preferred. The reason why fine particles are preferred is that the transparency of a coating in which they are mixed is not significantly decreased. In addition, the use of an ultraviolet shielding agent that shields ultraviolet rays having a wavelength of 365 nm is more preferred because the coming of insects can be prevented. As such an ultraviolet shielding agent, Parsol A, iron oxyhydroxide, iron oxide, titanium dioxide, zinc oxide, titanium phosphate, cerium phosphate, and the like can be used. The amount of the catalyst and the ultraviolet shielding agent added is appropriately set according to the purpose.

In addition, within the range of not inhibiting the effects of the present invention, various additives and fillers, such as a resin binder, a dispersing agent, a surface adjusting agent (a leveling agent and a wettability improving agent), a pH adjusting agent, an antifoaming agent, an emulsifier, a coloring agent, an extender, a fungicide, a curing aid, and a thickening agent, may be included as a third component. Examples of the resin binder include organic binders, such as alkyd resins, acrylic resins, polyester resins, epoxy resins, fluorine resins, and modified silicone resins. Examples of the dispersing agent include (1) surfactants ((a) anionic (carboxylates, sulfates, sulfonates, phosphates, and the like), (b) cationic (alkylamine salts, quaternary ammonium salts of alkylamines, aromatic quaternary ammonium salts, heterocyclic quaternary ammonium salts, and the like), (c) amphoteric (a betaine type, an amino acid type, alkylamine oxides, a nitrogen-containing heterocycle type, and the like), and (d) non-ionic (an ether type, an ether ester type, an ester type, a nitrogen-containing type, and the like)), (2) silicone dispersing agents (alkyl-modified polysiloxanes, polyoxyalkylene-modified polysiloxanes, and the like), (3) phosphate dispersing agents (sodium phosphate, sodium pyrophosphate, sodium orthophosphate, sodium metaphosphate, sodium tripolyphosphate, and the like), and (4) alkanolamines (aminomethyl propanol, aminomethyl propanediol, and the like). The surface adjusting agent controls surface tension to prevent defects, such as cissing and craters. Examples of the surface adjusting agent include acrylic surface adjusting agents, vinyl surface adjusting agents, silicone surface adjusting agents, and fluorine surface adjusting agents. The amount added is appropriately set according to the purpose.

The near-infrared shielding coating agent of the present invention can be manufactured by mixing respective predetermined amounts of the above components of (1) to (5). The catalyst, the ultraviolet shielding agent, or the above third component can be added, as required, in mixing. The mixing method is not particularly limited. For the dispersion of the inorganic near-infrared absorbing agent, for example, a paint conditioner, a colloid mill, a ball mill, a sand mill, or a homomixer can be used.

As a method for applying the above near-infrared shielding coating agent to a substrate, conventional methods can be used. General methods, such as spin coating, spray coating, roller coating, dip coating, flow coating, knife coating, electrostatic coating, bar coating, die coating, brush coating, and sponge coating, can be used. For dip coating, a near-infrared shielding coating can be fabricated on both surfaces of the substrate. For spin coating, spray coating, roller coating, flow coating, brush coating, sponge coating, and the like, a near-infrared shielding coating can be fabricated on one surface of the substrate. When the coating thickness is made thicker, recoating may be performed. When the solvent is removed from the applied material, a near-infrared shielding coating is formed. The coating formation is preferably performed at ordinary temperatures in the range of 5 to 40° C. Warm air or cool air may be fed in the coating formation to promote the coating formation. In addition, heating may be performed as required. The heating temperature can be appropriately set according to the heat resistance of the substrate and the like, and is specifically in the range of 40 to 500° C., preferably in the range of 40 to 200° C. The thickness of the near-infrared shielding coating can be any thickness by appropriately selecting the application method. For example, a thickness in the range of 1 to 10 nm is preferred because visible light transmissiveness can be increased. The thickness is more preferably 2 to 3 nm.

As the substrate on which the near-infrared shielding coating is formed, those of various materials and various shapes can be used. For example, those of various materials, such as plastics, glasses, ceramics, metals, woods, and fibers, can be used. In addition to transparent materials, such as glasses and plastics, opaque materials, such as steels and ceramics, colored materials, and materials provided with designs can also be used as the substrate. Specifically, glass plates and plastic plates can be preferably used as the substrate, and the near-infrared shielding coating of the present invention can be formed on them to be used for the windows of buildings, show windows, sunroofs, and the like, as well as the windows of automobiles, trains, and the like. In addition, those actually used can be used as the substrate. For example, the near-infrared shielding coating can be formed on the windows of buildings, show windows, sunroofs, roofs, walls, and the like, as well as the windows and bodies of automobiles, trains, and the like. For the purposes of improving the adhesiveness between the near-infrared shielding coating and the substrate, protecting the substrate, and the like, a primer layer may be previously formed on the substrate. For the purposes of protecting the near-infrared shielding coating, and the like, a top coat layer may be formed on the coating. Various inorganic binders, organic binders, and the like can be used for the formation of the primer layer and the top coat layer.

When the above near-infrared shielding coating agent is used and applied to at least one surface of the substrate, the near-infrared shielding coating can be formed. Although the performance of the near-infrared shielding coating fabricated in this manner also depends on the performance of the inorganic near-infrared absorbing agent, and the like, generally, the following are obtained.

(a) For solar radiation transmittance measured by the following method, a solar radiation transmittance of 85% or less is easily obtained, and the solar radiation transmittance is preferably 80% or less.

Method for Measuring Solar Radiation Transmittance

A near-infrared shielding coating liquid is applied to a glass plate (manufactured by MATSUNAMI, 53×76×t 1.3 mm) and dried at ordinary temperatures. Measurement is performed by an ultraviolet visible near-infrared spectrophotometer V-570 (manufactured by JASCO Corporation, using Spectralon <manufactured by Labsphere> as the standard plate) to measure spectral transmittance. Then, solar radiation transmittance (wavelength: 300 to 2500 nm) is calculated according to JIS R 3106.

(b) For the visible light transmittance of the near-infrared shielding coating measured by the following method, a visible light transmittance of 85% or more is easily obtained, and the visible light transmittance is preferably 90% or more.

Method for Measuring Visible Light Transmittance

Spectral transmittance is measured and visible light transmittance (wavelength: 380 to 780 nm) is calculated by the above method of (a).

(c) For the pencil hardness of the near-infrared shielding coating measured by the following method, a pencil hardness of 2 H is easily obtained, and the pencil hardness is preferably 4 H or more.

Method for Measuring Pencil Hardness

According to JIS K5400, the tips of pencils having different hardnesses are polished with sand paper, and a glass plate with the near-infrared shielding coating, placed on a floor, is slowly scratched by the tips of the pencils at an angle of 45° from the glass plate.

When the pencil hardness is higher than the hardness of the coating, a scratch is made on the coating surface, and conversely, when the pencil hardness is lower than the hardness of the coating, a nick is made at the pencil tip. Therefore, a pencil hardness at which the hardness of the coating exceeds the pencil hardness is taken as coating hardness.

As described above, the near-infrared shielding coating agent can be applied to at least one surface of the substrate to provide an article in which a near-infrared shielding coating is formed. This article is one in which a near-infrared shielding coating is formed on at least one surface of the above substrate, and can be manufactured by applying the near-infrared shielding coating agent to at least one surface of the substrate and drying it at ordinary temperatures of about 5 to 40° C.

In addition, the near-infrared shielding coating can be combined with a photocatalytic coating. Specifically, an article in which a photocatalytic coating is formed on at least a part of the near-infrared shielding coating can be provided. This article is obtained by forming the near-infrared shielding coating, and then forming the photocatalytic coating on at least a part of the above near-infrared shielding coating by a publicly known method. As the method for forming the photocatalytic coating, a method of applying a coating agent comprising a photocatalyst (hereinafter sometimes referred to as a photocatalyst coating agent) and drying it is simple and preferred. After the above near-infrared shielding coating agent is applied, the photocatalyst coating agent may be applied still in a wet state, or the photocatalyst coating agent may be applied in a dry state. For the drying temperature, ordinary temperatures of about 5 to 40° C. are preferred.

In addition, an article in which the near-infrared shielding coating is formed on one surface of the substrate, and the photocatalytic coating is formed on the other surface of the substrate can also be provided, and it is preferred to form the photocatalytic coating on the substrate surface opposite to the near-infrared shielding coating. In this article, the above near-infrared shielding coating agent is applied to one surface of the substrate, and the photocatalytic coating is formed on the other surface of the substrate by a publicly known method. As the method for forming the photocatalytic coating, a method of applying the photocatalyst coating agent and drying it is simple and preferred. The order (before or after) of the application of the near-infrared shielding coating agent and the application of the photocatalyst coating agent may be either. For the drying temperature, ordinary temperatures of about 5 to 40° C. are preferred.

For the substrate, those of various materials and various shapes can be used, as described above. Glass plates and plastic plates can be preferably used, and glass plates and plastic plates having high transparency are more versatile. Such articles can be used for the windows of buildings, show windows, sunroofs, and the like, as well as the windows of automobiles, trains, and the like. In addition, those actually used can be used as the substrate. For example, the near-infrared shielding coating and the photocatalytic coating can be formed on the windows of buildings, show windows, sunroofs, and the like, as well as the windows of automobiles, trains, and the like.

The above photocatalyst is a substance that exhibits photocatalytic property when irradiated with light having energy equal to or higher than its band gap. One or two or more of publicly known metal compound semiconductors, such as titanium oxide, zinc oxide, tungsten oxide, iron oxide, and strontium titanate, can be used. Particularly, titanium oxide, which has excellent photocatalytic property and is chemically stable and harmless, is desired. Titanium oxide includes, in addition to titanium oxide, those generally called hydrous titanium oxide, hydrated titanium oxide, orthotitanic acid, metatitanic acid, and titanium hydroxide. Titanium oxide may have any crystal systems of an anatase type, a brookite type, a rutile type, and the like, and may have mixed crystal systems. Further, in order to improve the photocatalytic property, at least one metal of elements selected from the group consisting of V, Fe, Co, Ni, Cu, Zn, Ru, Rh, Pt, Pd, and Ag, and/or compound thereof may be contained in its interior and/or on its surface. The particle diameter of the photocatalyst is preferably fine because it has excellent photocatalytic property. The particle diameter of the photocatalyst is more preferably in the range of 1 to 500 nm, further preferably in the range of 1 to 400 nm, and most preferably in the range of 1 to 300 nm.

In addition, for the photocatalyst, those having visible light response ability excited by irradiation with visible light can also be applied. Usually, only several % ultraviolet light, which can excite the photocatalyst, is included in natural light, and therefore, by making the photocatalyst a visible light response type, objects to be treated can be effectively decomposed, effectively using natural light. For the photocatalysts having visible light response ability, those publicly known can be used. For example, those in which titanium oxide is doped with a different element, such as sulfur (S), nitrogen (N), or carbon (C), those in which a different metal ion is dissolved in titanium oxide, those in which a halogenated platinum compound, iron oxyhydroxide, or the like is supported on the surfaces of titanium oxide particles, those in which titanium oxide particles are complexed with a compound that exhibits photocatalytic property in the visible light region, such as iron oxide or tungsten oxide, those in which the compositional ratio of the titanium and the oxygen of the titanium oxide is changed, or the like can be preferably used.

The photocatalyst coating agent is a composition comprising the above photocatalyst, a binder, and a solvent, and publicly known coating agents can be used. In addition, in the near-infrared shielding coating agent of the present invention, a photocatalyst coating agent using the photocatalyst, instead of (1) the inorganic near-infrared absorbing agent, and using the above tetrafunctional silicon type compounds of (2), the above trifunctional silicon type compounds of (3), the above silane type coupling agents of (4), and the above solvent of (5) can be preferably used. Such a photocatalyst coating agent does not require heating at a temperature of 200° C. or more, and the binder can be cured at ordinary temperatures of about 5 to 40° C. Thus, a photocatalytic coating that has high coating hardness and is less likely to crack can be formed at ordinary temperatures.

The content of the photocatalyst is preferably 5 to 98% by weight, more preferably 25 to 98% by weight, with respect to the total amount of the solids of the photocatalyst coating agent. If the content is less than 5% by weight, the photocatalytic property decreases, which is not preferred. If the content is more than 98% by weight, the coating hardness tends to decrease, which is not preferred. In addition, the photocatalyst coating agent may comprise a third component, such as various additives and fillers, such as a resin binder, a dispersing agent, a surface adjusting agent (a leveling agent and a wettability improving agent), a pH adjusting agent, an anti-foaming agent, an emulsifier, a coloring agent, an extender, a fungicide, a curing aid, and a thickening agent, and catalysts for hydrolysis and polycondensation.

As a method for dispersing the photocatalyst and a method for applying the photocatalyst coating agent to the substrate, the above methods can be used. When the solvent is removed from the applied material, a photocatalytic coating is formed. The coating formation is preferably performed at ordinary temperatures in the range of 5 to 40° C. Warm air or cool air may be fed in the coating formation to promote the coating formation. In addition, heating may be performed as required. The heating temperature can be appropriately set according to the heat resistance of the substrate and the like, and is specifically in the range of 40 to 500° C., preferably in the range of 40 to 200° C. The thickness of the photocatalytic coating can be any thickness by appropriately selecting the application method. For example, a thickness in the range of 1 to 200 nm is preferred because visible light transmissiveness can be increased. The thickness is more preferably 50 to 100 nm. For the purposes of improving the adhesiveness between the photocatalytic coating and the substrate, protecting the substrate, and the like, a primer layer may be previously formed on the substrate to which the photocatalyst coating agent is to be applied. For the purposes of protecting the photocatalytic coating, and the like, a top coat layer may be formed on the coating. Various inorganic binders, organic binders, and the like can be used for the formation of the primer layer and the top coat layer.

By irradiating the above photocatalytic coating with light of a wavelength having energy equal to or higher than the band gap, hydrophilicity, antifogging properties, and contamination prevention properties can be provided. By light irradiation, hydrophilicity with a water contact angle of 10° or less, preferably 5° or less, can be obtained, and it is possible to prevent the formation of liquid drops, prevent fogging due to the solidification of water vapor, and prevent the adhesion of contaminants. In addition, it is possible to decompose objects to be treated, which are adhered to the photocatalytic coating, for example, harmful substances, malodorous substances, and oil, for purification and disinfection. Particularly, water pollutants, such as oil and organic matter, air pollutants, such as ammonia, mercaptans, aldehydes, amines, hydrogen sulfide, hydrocarbons, sulfur oxide, and nitrogen oxide, and environmental deterioration substances, such as bacteria, fungi, microorganisms, and various contamination components, can be targeted. As the light source for light irradiation, a light source that can emit light having energy equal to or higher than the band gap of the photocatalyst is used. For example, natural light sources, such as the sun, and artificial light sources, such as an ultraviolet lamp, black light, a mercury lamp, a xenon lamp, a fluorescent lamp, and an incandescent lamp, can be used. In addition, in the case of the visible light response type photocatalyst, light comprising visible light can be used. The light irradiation amount and irradiation time, and the like can be appropriately set, depending on the amount of the substances to be treated, and the like.

EXAMPLES

Examples of the present invention will be illustrated below, but the present invention is not limited thereto.

1. Preparation of Near-Infrared Shielding Coating Agent

Examples 1 to 5 and Comparative Examples 1 to 3

20 Parts by weight of water and 6 parts by weight of acetic acid were placed in a synthesis container, and stirred with the liquid temperature maintained at 0 to 10° C. A total amount of 43.5 parts by weight of components (a) to (d) having a component mixing ratio described in Table 1 were added therein. At the time, they were added little by little for each component, and stirred for 16 hours, while the liquid temperature was maintained at 10° C.

Then, the liquid temperature was set to 20° C. 0.5 Parts by weight of sodium acetate was added, and n-propanol was added so that the amount of the heating residue of this solution (the amount of the residue after the solution was dried at 120° C. for 1 hour) became 25 to 26%.

Next, antimony-doped tin oxide (manufactured by ISHIHARA SANGYO KAISHA, LTD., SN-100P) as an inorganic near-infrared absorbing agent was added to the above solution so that PWC (the weight ratio of the inorganic near-infrared absorbing agent to all solids in the solution) was 75%, and dispersed using a paint conditioner manufactured by RedDevil, to obtain a near-infrared shielding coating agent.

2. Method for Forming Near-Infrared Shielding Coating

The surface of a soda glass plate (manufactured by MATSUNAMI, 53×76×t 1.3 mm) was ethanol-wiped, and then air-blown to provide a substrate. Each of the near-infrared shielding coating agents synthesized by the above Examples 1 to 5 and Comparative Examples 1 to 3 in 1. was placed in a paint tank, and the above substrate was pulled up at a speed of 150 to 250 mm/min and dried at room temperature to form a near-infrared shielding coating on the substrate.

3. Performance Tests 1 of Near-Infrared Shielding Coating

The performance tests of the near-infrared shielding coatings formed by the above method in 2. were performed by the following methods. The results are shown in Table 2.
(1) Initial tape adhesiveness: A cross cut was made on the coated surface by an NT cutter, and cellophane tape was pressed against the portion and peeled. Then, the peeling condition of the coating was checked.
(2) Coating dryness: After the coated plate was made, it was left in a room, and the dry state after 30 minutes was examined by finger touch.
(3) Abrasion resistance: Steel wool was placed on the coating surface with a load of 100 g, the surface was rubbed 10 times, and the extent of scratching on the surface was examined.
(4) Cracking with time: After the coated plate was made, it was left in a room for 10 days, and the cracking of the coating was examined.

TABLE 2

|  | Initial tape adhesiveness | Coating dryness | Abrasion resistance | Cracking with time |
|---|---|---|---|---|
| Example 1 | ⊚ | ○ | ○ | ⊚ |
| Example 2 | ⊚ | ○ | ⊚ | ⊚ |
| Example 3 | ⊚ | ⊚ | ⊚ | Δ |
| Example 4 | ⊚ | Δ | ○ | ⊚ |
| Example 5 | ⊚ | ○ | Δ | ⊚ |
| Comparative Example 1 | ⊚ | X | X | ⊚ |
| Comparative Example 2 | ⊚ | X | X | ⊚ |
| Comparative Example 3 | ⊚ | ○ | ⊚ | X |

Evaluation;
⊚—Good,
○—Average,
Δ—Slightly poor,
X—Bad

4. Performance Tests 2 of Near-Infrared Shielding Coating

A sample fabricated by applying the near-infrared shielding coating agent of Example 1 to a glass plate (manufactured

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| (a) Tetramethoxysilane | 11.5 | 11.5 | 59.8 | 11.5 | 11.5 | — | 11.5 | 59.8 |
| (b) Ethyltrimethoxysilane | 80.5 | 80.5 | 32.2 | 48.3 | 88.0 | 92.0 | 88.5 | — |
| (c) Epoxycyclohexylethyltrimethoxysilane | 8.0 | — | 8.0 | 40.2 | 0.5 | 8.0 | — | 40.2 |
| (d) Ureidopropyltriethoxysilane | — | 8.0 | — | — | — | — | — | — |
| Total | 100.0 | 100.0 | 100.0 | 100.0 | 100.0 | 100.0 | 100.0 | 100.0 | by MATSUNAMI, 53×76×t 1.3 mm) and drying it at ordinary temperatures was used, and the solar radiation transmittance and the like of the near-infrared shielding coating were measured by the following methods.
(1) Measurement of Solar Radiation Transmittance and Visible Light Transmittance For the above sample, measurement was performed by an ultraviolet visible near-infrared spectrophotometer V-570 (manufactured by JASCO Corporation, using Spectralon <manufactured by Labsphere> as the standard plate) to measure spectral transmittance. Then, solar radiation transmittance (wavelength: 300 to 2500 nm) was calculated according to JIS R 3106, and, as a result, was 79.3%.

In addition, visible light transmittance (wavelength: 380 to 780 nm) was calculated from the above spectral transmittance, and, as a result, was 93.0%.

(2) The pencil hardness of the above sample was measured according to JIS K5400, and, as a result, was 3 H.

(3) An artificial sunlight irradiation apparatus, model SXL-501V1, (manufactured by SERIC LTD., light source; three xenon bulb type, 500 W) was used. The above sample was located under the light source at a distance of 500 mm, and a temperature sensor (EMPEX INSTRUMENTS, INC., TD-8182) was placed under the sample at a position 50 mm from the sample. The temperature of the temperature sensor when the sample was irradiated with light for 5 minutes was measured, and compared with a case where a glass plate (manufactured by MATSUNAMI, 53×76×t 1.3 mm) was used. As a result, the temperature for the above sample was lower, and the difference was 10° C. From this, it was found that when the near-infrared shielding coating is used, the effect of suppressing temperature is obtained.

The near-infrared shielding coating agent of Example 1 was applied to a glass plate (manufactured by MATSUNAMI, 53×76×t 1.3 mm), and next, a photocatalyst coating agent (ST-K253 manufactured by ISHIHARA SANGYO KAISHA, LTD.) was applied to the opposite surface of the glass plate. They were dried at ordinary temperatures.

The solar radiation transmittance and visible light transmittance of this sample were measured by the above methods. As a result, the solar radiation transmittance was 79.1%, and the visible light transmittance was 92.9%.

In addition, the contact angle of water after this sample was irradiated with black light having an ultraviolet intensity of 0.5 mW/cm$^2$ for 6 hours was measured, and, as a result, was 36°. The contact angle of water after this sample was irradiated for 24 hours was measured, and, as a result, was 5°. It was confirmed that photocatalytic property was exhibited.

It was found that a near-infrared shielding coating that has high coating hardness and is less likely to crack can be fabricated at ordinary temperatures of about 5 to 40° C. by using three of tetrafunctional silicon type compounds, trifunctional silicon type compounds, and silane type coupling agents, as described above. In addition, it was found that the near-infrared shielding coating can be combined with a photocatalytic coating, and, in addition to near-infrared shielding property, hydrophilicity and the like can be provided to the substrate by photocatalytic property.

Example 6

Operation was performed as in Example 1, except that iron oxyhydroxide fine particles (goethite, FeOOH, manufactured by ISHIHARA SANGYO KAISHA, LTD.) as an inorganic ultraviolet shielding agent were further added so that PWC (the weight ratio of the inorganic ultraviolet shielding agent to all solids in the solution) was 2.3%, in Example 1, to obtain a near-infrared shielding coating agent.

Example 7

Operation was performed as in Example 1, except that titanium dioxide fine particles (TiO$_2$, manufactured by ISHIHARA SANGYO KAISHA, LTD.) as an inorganic ultraviolet shielding agent were further added so that PWC (the weight ratio of the inorganic ultraviolet shielding agent to all solids in the solution) was 2.6%, in Example 1, to obtain a near-infrared shielding coating agent.

Each of the near-infrared shielding coating agents of Examples 6 and 7 was applied to a glass plate (manufactured by MATSUNAMI, 53×76×t 1.3 mm) and dried at ordinary temperatures to fabricate a near-infrared shielding coating. Solar radiation transmittance and visible light transmittance were measured as in the above 4. Performance Tests 2 of Near-infrared shielding coating. In addition, the ultraviolet transmittance of the above near-infrared shielding coatings was measured by the following method.

(4) Measurement of Ultraviolet Transmittance

For the above samples, measurement was performed by an ultraviolet visible near-infrared spectrophotometer V-570 (manufactured by JASCO Corporation, using Spectralon <manufactured by Labsphere> as the standard plate) to measure spectral transmittance at wavelengths of 310 nm and 360 nm as a standard of ultraviolet shield ability.

The obtained results are shown in Table 3. It was found that both of Examples 6 and 7 had lower ultraviolet transmittance than Example 1, and had ultraviolet shielding properties. Particularly, in Example 6, the ultraviolet transmittance at 360 nm was low, and in Example 7, the ultraviolet transmittance at 310 nm was low. Moreover, it was found that the visible light transmittance and solar radiation transmittance of Examples 6 and 7 bore comparison with those of Example 1.

TABLE 3

| | Ultraviolet transmittance (%) | | Visible light transmittance | Solar radiation transmittance |
|---|---|---|---|---|
| | 310 nm | 360 nm | (%) | (%) |
| Example 6 | 9.6 | 22.0 | 89.6 | 77.2 |
| Example 7 | 4.3 | 66.2 | 92.3 | 80.5 |
| Example 1 (ref) | 83.0 | 82.7 | 92.5 | 79.3 |

INDUSTRIAL APPLICABILITY

With the near-infrared shielding coating agent of the present invention, a near-infrared shielding coating can be fabricated at ordinary temperatures of about 5 to 40° C., and the near-infrared shielding coating agent of the present invention can also be applied to substrates vulnerable to heat, such as plastics. Therefore, near-infrared shielding property can be provided to the surfaces of all substrates.

When the near-infrared shielding coating is formed on a member, such as a window of a building, near-infrared rays can be shielded to suppress an increase in interior temperature and improve comfortableness.

The invention claimed is:

1. A near-infrared shielding coating agent curable at temperatures from about 5 to 40° C., comprising:
   (1) an inorganic near-infrared absorbing agent;
   (2) at least one selected from a tetrafunctional silicon compound represented by a general formula $Si(OR1)_4$, wherein R1 is the same or different and is an alkyl group having 1 to 10 carbon atoms, a hydrolysate thereof, and a polycondensate thereof;
   (3) at least one selected from a trifunctional silicon compound represented by a general formula $R2Si(OR3)_3$, wherein each of R2 and R3 is the same or different and is an alkyl group having 1 to 10 carbon atoms, a hydrolysate thereof, and a polycondensate thereof;
   (4) at least one selected from a silane coupling agent represented by a general formula $Si(X)_3$—Y or $R4Si(X)_2$—Y, wherein X is the same or different and represents an alkoxy group, an acetoxy group, or a chlorine atom, R4 is an alkyl group having 1 to 10 carbon atoms, and Y represents an organic group excluding an alkyl group, an alkoxy group, and an acetoxy group, a hydrolysate thereof, and a polycondensate thereof; and (5) a solvent;

wherein a weight ratio of the components of (2) and (3) is 1:1 to 1:10.

2. The near-infrared shielding coating agent curable at temperatures from about 5 to 40° C. according to claim 1, wherein a content of the component of (4) is 1 to 30% by weight with respect to a total amount of the components of (2) and (3).

3. The near-infrared shielding coating agent curable at temperatures from about 5 to 40° C. according to claim 1, wherein the inorganic near-infrared absorbing agent of (1) is a fine particle comprising at least one selected from the group of tin oxide, indium oxide, zinc oxide, and lanthanum boride, as a main component.

4. The near-infrared shielding coating agent curable at temperatures from about 5 to 40° C. according to claim 3, wherein the inorganic near-infrared absorbing agent is an antimony-doped tin oxide fine particle.

5. The near-infrared shielding coating agent curable at temperatures from about 5 to 40° C. according to claim 1, wherein a content of the inorganic near-infrared absorbing agent of (1) is 40 to 90% by weight with respect to a total amount of solids of the coating agent.

6. The near-infrared shielding coating agent curable at temperatures from about 5 to 40° C. according to claim 1, further comprising an ultraviolet shielding agent.

7. A near-infrared shielding coating formed by applying a near-infrared shielding coating agent curable at temperatures from about 5 to 40° C. according to claim 1 to at least one surface of a substrate.

8. The near-infrared shielding coating according to claim 7, having a pencil hardness of 2H or more.

9. The near-infrared shielding coating according to claim 7, having a visible light transmittance of 85% or more and a solar radiation transmittance of 85% or less.

10. A method for manufacturing a near-infrared shielding coating, comprising applying a near-infrared shielding coating agent curable at temperatures from about 5 to 40° C. according to claim 1 to at least one surface of a substrate, and drying the near-infrared shielding coating agent at temperatures from about 5 to 40° C.

11. An article comprising a near-infrared shielding coating formed by applying a near-infrared shielding coating agent curable at temperatures from about 5 to 40° C. according to claim 1 to at least one surface of a substrate.

12. The article according to claim 11, wherein a photocatalytic coating is formed on at least a part of the near-infrared shielding coating.

13. The article according to claim 11, wherein the near-infrared shielding coating is formed on one surface of the substrate, and a photocatalytic coating is formed on the other surface of the substrate.

14. The article according to claim 11, wherein the substrate is a glass plate or a plastic plate.

15. A method for manufacturing an article, comprising applying a near-infrared shielding coating agent curable at temperatures from about 5 to 40° C. according to claim 1 to at least one surface of a substrate, and drying the near-infrared shielding coating agent at temperatures from about 5 to 40° C.

16. A method for manufacturing an article, comprising applying a near-infrared shielding coating agent curable at temperatures from about 5 to 40° C. according to claim 1 to at least one surface of a substrate, then applying a coating agent comprising a photocatalyst thereonto, and drying the agents.

17. A method for manufacturing an article, comprising applying a near-infrared shielding coating agent curable at temperatures from about 5 to 40° C. according to claim 1 to one surface of a substrate, applying a coating agent comprising a photocatalyst to the other surface of the substrate, and drying the agents.

* * * * *